(12) United States Patent
Chen (10) Patent No.: US 8,522,262 B1
(45) Date of Patent: Aug. 27, 2013

(54) OPTICAL-DISC PLAYER

(75) Inventor: Yung Ta Chen, Guangdong (CN)

(73) Assignee: Valley Wood Electrical (Shenzhen) Co., Ltd., Shenzhen (CN)

( * ) Notice: Subject to any disclaimer, the term of this patent is extended or adjusted under 35 U.S.C. 154(b) by 0 days.

(21) Appl. No.: 13/607,929

(22) Filed: Sep. 10, 2012

(30) Foreign Application Priority Data

Feb. 24, 2012 (CN) .......................... 2012 1 0043364

(51) Int. Cl.
*G11B 17/03* (2006.01)
(52) U.S. Cl.
USPC ........................................................ 720/624
(58) Field of Classification Search
USPC ........................................................ 720/624
See application file for complete search history.

(56) References Cited

U.S. PATENT DOCUMENTS

| | | | | |
|---|---|---|---|---|
| 5,416,763 A * | 5/1995 | Ohsaki | ........................ | 720/623 |
| 6,574,185 B2 * | 6/2003 | Nakatani et al. | ............. | 720/624 |
| 7,107,603 B2 * | 9/2006 | Tuchiya | ........................ | 720/713 |
| 7,437,745 B2 * | 10/2008 | Seol | .............................. | 720/624 |
| 7,559,068 B2 * | 7/2009 | Kido | ............................. | 720/624 |
| 7,814,504 B2 * | 10/2010 | Aoki et al. | .................... | 720/624 |
| 7,814,508 B2 * | 10/2010 | Fujisawa | ...................... | 720/713 |
| 8,099,742 B2 * | 1/2012 | Chen | ............................ | 720/620 |

* cited by examiner

*Primary Examiner* — Mark Blouin
(74) *Attorney, Agent, or Firm* — Jackson IPG PLLC (57) ABSTRACT

The invention relates to an optical-disc player, which comprises a pair of optical-disc sensor levers, a conveying roller used for conveying an optical disc by clamping he optical disc on an optical-disc guide plate, a roller supporting component, a driving member embedded with the roller supporting component, a cam gear used for moving the driving member, a driving gear used for driving the cam gear, switches used for controlling the rotation of a motor, and a traverse mechanism having a pick-up and a turntable, wherein the component, embedded with the roller supporting component and used for driving the conveying roller and the optical-disc guide plate to be engaged and disengaged, on the driving member is an E-shaped cam hole; a convex portion, a first toothed portion and a second toothed portion are formed on the cam gear; and a toothless portion is formed between the two toothed portions.

4 Claims, 7 Drawing Sheets

OPTICAL-DISC PLAYER

FIELD OF THE INVENTION

The invention relates to an optical-disc player, in particular to an optical-disc player which conveys an optical disc between an optical-disc inserting opening and a play position via the rotation of a conveying roller.

BACKGROUND OF THE INVENTION

The optical-disc player which conveys the optical disc between the optical-disc inserting opening and the play position via the rotation of the conveying roller comprises a pair of optical-disc sensor levers used for detecting the optical disc inserted into the optical-disc inserting opening, the conveying roller used for clamping the optical disc on an optical-disc guide plate and conveying the optical disc by being driven by a motor, a roller supporting component capable of driving the conveying roller and the optical-disc guide plate to be disengaged, and a driving member used for driving the roller supporting component to operate via the motor power for the disengagement between the conveying roller and the optical-disc guide plate. Moreover, a detection part connected with the periphery of the optical disc is arranged on each optical-disc sensor lever. Once the detection part is driven by the optical disc inserted into the optical-disc inserting opening, the optical-disc sensor lever will rotate, and then a switch for starting the motor will operate.

When the optical disc is inserted into the optical-disc inserting opening, the optical disc comes into contact with the detection parts and then the optical-disc sensor levers will rotate. Firstly, the motor is started and the conveying roller is driven to rotate. Secondly, the optical disc is clamped by the conveying roller and the optical-disc guide plate and conveyed to the play position (namely a turntable) through the rotation of the conveying roller. Therefore, the optical disc is inserted between the rotated conveying roller and the optical-disc guide plate and can be smoothly inserted as the optical disc has no insertion impedance when inserted. When the optical disc is conveyed to the play position, the conveying roller is driven by the roller supporting component and the driving member to move to a position at which the rotation of the optical disc is not affected. Moreover, when the optical disc is taken out, the optical disc is kept in the state of being clamped by the conveying roller and the optical-disc guide plate, so as to be prevented from being dropped out from the inserting opening.

In the optical-disc player, the inclination angle between the moving direction of a pick-up for the traverse mechanism and the optical-disc conveying direction is approximately 45 DEG, so that the miniaturization of the optical-disc player can be realized.

In the optical-disc player, the motor must be started in advance in order to eliminate the insertion impedance of the optical disc when inserted for smooth insertion operation, and the detection parts of the optical-disc sensor levers must be arranged at one side of the optical-disc inserting opening at more forward part of the conveying roller. However, if the detection parts are arranged at more forward part of the conveying roller, the optical-disc player would be upsized.

SUMMARY OF THE INVENTION

The objective of the invention is to provide an optical-disc player capable of being miniaturized and eliminating the insertion impedance of an optical disc when inserted for smooth insertion operation.

The invention relates to an optical-disc player, which comprises:

a pair of optical-disc sensor levers respectively having a detection part capable of being embedded into the periphery of an optical disc inserted into an optical-disc inserting opening and rotating immediately once the detection part is driven by the optical disc;

a conveying roller used for clamping the optical disc on an optical-disc guide plate and conveying the optical disc between the optical-disc inserting opening and a turntable through the rotation of a motor;

a roller supporting component used for supporting the conveying roller;

a driving member embedded with the roller supporting component and used for driving the conveying roller and the optical-disc guide plate to be engaged and disengaged during the reciprocating motion;

a cam gear used for moving the driving member;

a driving gear used for driving the cam gear via a rotary force of the motor;

switches used for controlling the rotation of the motor, and a traverse mechanism having a pick-up and the turntable, wherein the component, embedded with the roller supporting component and used for driving the conveying roller and the optical-disc guide plate to be engaged and disengaged, on the driving member is an E-shaped cam hole; and a convex portion, a first toothed portion and a second toothed portion are formed on the cam gear, and a toothless portion is formed between the two toothed portions.

The optical-disc player also comprises:

a shaking component embedded onto the driving gear and shaking along with the rotation of the driving gear, and a hook component supported by the shaking component, wherein the hook component has a contact portion capable of being embedded with the optical-disc sensor lever and a hook portion capable of being embedded with the convex portion of the cam gear;

when the optical disc is taken out from the optical-disc inserting opening, the hook portion is embedded with an end section of the convex portion by the disembedding between the optical-disc sensor lever and the contact portion; the cam gear is driven to rotate by the shaking of the shaking component via the hook component and the driving gear is engaged with the first toothed portion; the cam gear is driven to rotate continuously and the driving member is driven to move to a mobile terminal position, and then the conveying roller and the optical-disc guide plate are disengaged from each other.

Preferably, the switches consist of a first switch used for driving the motor to stop rotating when the optical disc is conveyed from a play position to the optical-disc inserting opening until the optical disc can be taken out, a second switch used for starting the motor when the optical disc is taken out from the optical-disc inserting opening, and a third switch used for driving the motor to stop rotating on a rotation terminal of the cam gear.

Preferably, the detection parts of the optical-disc sensor levers are arranged between the conveying roller and the turntable, so that the optical-disc player can be more miniaturized.

Preferably, the moving direction of the pick-up for the traverse mechanism is perpendicular to the optical-disc conveying direction, so that the frame dimension in the optical-disc conveying direction is less than the diameter of the optical disc.

The component, used for being embedded with the roller supporting component and driving the conveying roller and the optical-disc guide plate to be engaged and disengaged, on the driving member is an E-shaped cam hole. When the optical disc is taken out from the optical-disc inserting opening, the conveying roller and the optical-disc guide plate can be disengaged from each other, and an optical-disc inserting gap is preserved for the optical disc to be inserted into the gap formed after the conveying roller and the optical-disc guide plate are disengaged from each other when the optical disc is inserted into the optical-disc inserting opening next time. Therefore, the insertion impedance of the optical disc when inserted can be eliminated for smooth insertion operation. Moreover, when the optical disc is inserted, as the conveying roller does not need to rotate in advance, the detection parts of the optical-disc sensor levers can be arranged at positions close to the conveying roller, and thus the optical-disc player can be miniaturized.

DETAILED DESCRIPTION OF THE PREFERRED EMBODIMENTS

Further description is given to the invention with the attached drawings and embodiments.

First Embodiment

Figure 1:
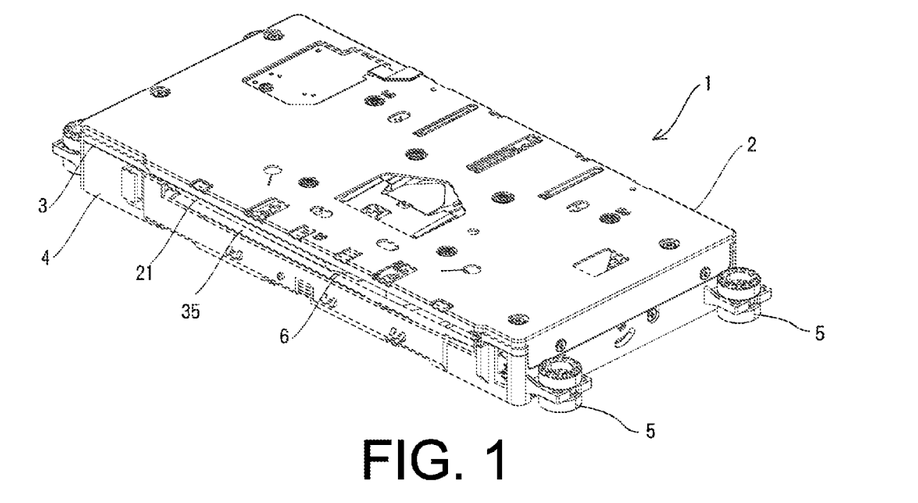
FIG. 1 is an outside view of a frame for an optical-disc player of an embodiment of the invention.
Figure 12:
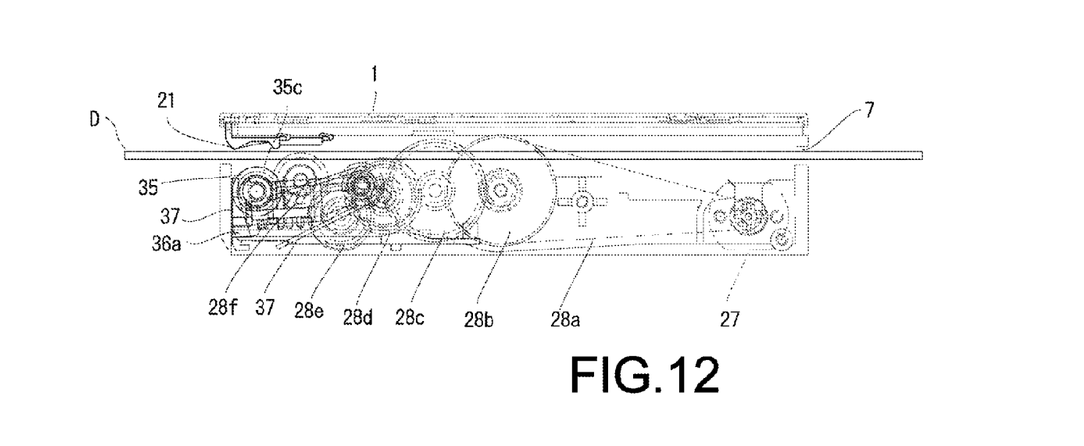
FIG. 12 is a side view of the optical-disc player when the optical disc is played.

FIG. 1 is an outside view of the optical-disc player. As illustrated in FIG. 1, a frame 1 of the optical-disc player consists of an upper base 2 which is made of metal and a middle base 3 and a lower base 4 which are made of synthetic resin, wherein first dampers 5 for vibration resistance are arranged at two sides of the frame 1; the frame 1 is rectangular; an optical-disc inserting opening 6 is formed on one end face of the side with long length; and the length of the side with short length is less than the diameter of a major-diameter optical disc D (an optical disc with the diameter of 12 cm). Moreover, a convex hole 7 which drives the optical disc D to be protruded out of the frame 1 is formed on an end face of the side opposite to the optical-disc inserting opening 6 (as illustrated in FIG. 12).

Figure 2:
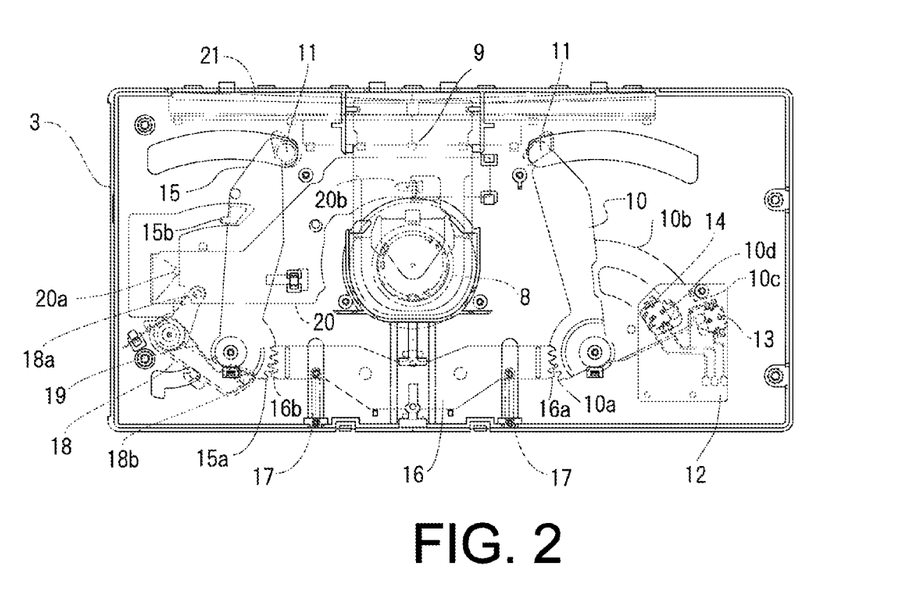
FIG. 2 is a plan view of a middle base for the optical-disc player.

FIG. 2 is a plan view of the middle base 3. As illustrated in FIG. 2, a clamper supporting plate 9 for supporting a clamper 8 is arranged in the middle of the surface of the middle base 3. The clamper supporting plate 9 endows the clamper 8 with thrust at the rear side via a spring (not illustrated in the figure). A second optical-disc sensor lever 15 and a first optical-disc sensor lever 10 are respectively arranged at left and right sides of the clamper supporting plate 9 and can rotate freely on the surface of the middle base 3. A first gear 10a and a quadrant cam 10b are formed at the rotation tail of the first optical-disc sensor lever 10. Moreover, a lug (namely a detection part) 11 connected with the periphery of the optical disc inserted into the optical-disc inserting opening 6 is formed at the rotation front of the first optical-disc sensor lever 10, towards the reverse side of the middle base 3. Furthermore, a circuit substrate 12 is arranged on the quadrant cam 10b; a first switch 13 and a second switch 14 are arranged on the circuit substrate 12; and a first cam 10c embedded onto the first switch 13 and a second cam 10d embedded onto the second switch 14 are formed on the quadrant cam 10b.

Moreover, a second gear 15a is formed at the rotation tail of the second optical-disc sensor lever 15; a lug (namely a detection part) 11 connected with the periphery of the optical disc inserted into the optical-disc inserting opening 6 is formed at the rotation front of the second optical-disc sensor lever 15, towards the reverse side of the middle base 3; and a lug 15b is formed in the middle part, towards the reverse side of the middle base 3.

A link plate 16 is arranged in the middle of the middle base 3 and has a third gear 16a which is often engaged with the first gear 10a of the first optical-disc sensor lever 10 and a fourth gear 16b which is often engaged with the second gear 15a of the second optical-disc sensor lever 15. The link plate 16 is set to be able to move to and fro freely towards the direction of the optical-disc inserting opening 6. Moreover, the link plate 16 is endowed with tension far away from the optical-disc inserting opening 6 by a first coil spring 17. Due to the tension, the second optical-disc sensor lever 15 is driven to rotate clockwise while the first optical-disc sensor lever 10 is driven to rotate counterclockwise.

A trigger arm 18 which rotates freely is arranged at the rear of the middle base 3. The middle part of the trigger arm 18 is supported by a shaft for the middle base 3. A pin stop 18a is formed at one end and the other end 18b can make contact with the periphery of a major-diameter optical disc conveyed from the optical-disc inserting opening 6. However, the other end 18b does not make contact with the periphery of a minor-diameter optical disc conveyed from the optical-disc inserting opening 6. Moreover, the trigger arm 18 is endowed with a counterclockwise rotary force by a second coil spring 19. A clamper control board 20 which can move freely horizontally is arranged on the surface of the middle base 3 and between the clamper supporting plate 9 and the second optical-disc sensor lever 15. One end 20a of the clamper control board 20 is protruded out of the rear side of the middle base 3, and a third cam 20b which is embedded with the clamper supporting plate 9 and drives the clamper 8 to move in the direction perpendicular to the surface of the middle base 3 is formed at the other end of the clamper control board 20. Moreover, an optical-disc guide plate 21 for guiding the optical disc is arranged at the rear of the middle base 3 and at one side of the optical-disc inserting opening 6.

Figure 3:
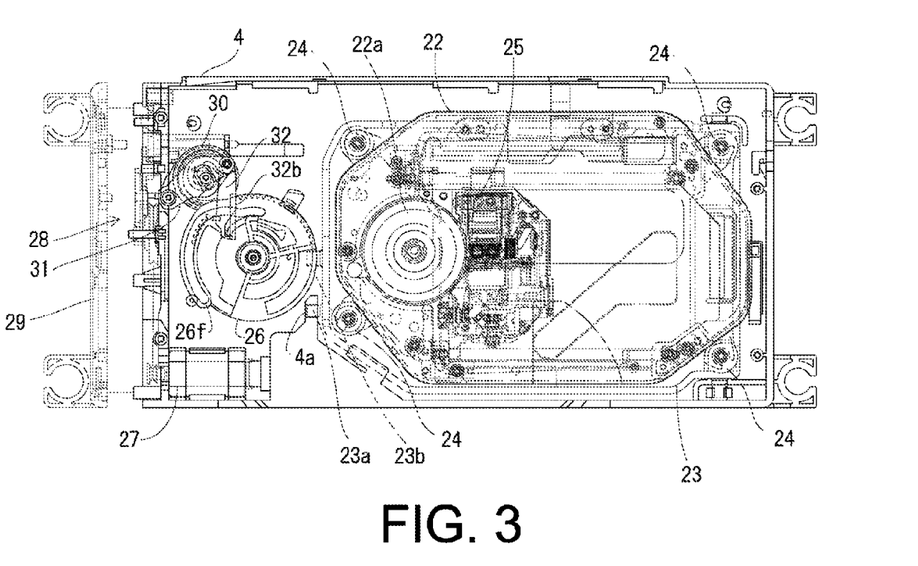
FIG. 3 is a plan view of a lower base for the optical-disc player.

FIG. 3 is a plan view of the lower base 4. As illustrated in FIG. 3, a traverse mechanism 22 for optical-disc playing is supported by a mechanism base 23 and a turntable 22*a* is arranged in the middle of the lower base 4. The traverse mechanism 22 is arranged on the mechanism base 23 via a second damper 24, and a pick-up 25 for optical-disc playing is driven to move to and fro freely and arranged on the right. The width of the traverse mechanism 22 is less than the diameter of the optical disc. The to-and-fro moving direction of the pick-up 25 is relatively perpendicular to the optical-disc conveying direction. Therefore, the length of the side with short length of the frame 1 can be set to be less than the diameter of the major-diameter optical disc D (the optical disc with the diameter of 12 cm).

Figure 6A:
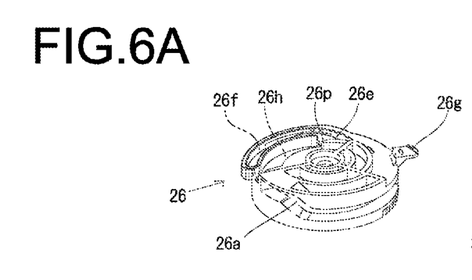
FIGS. 6A and 6B are stereograms of a cam gear for the optical-disc player.

Moreover, the right end of the mechanism base 23 is freely rotatably shaft-supported by the lower base 4, and a guide pin 23*a* which is embedded with a guiding groove 4*a* on the lower base 4 and a first embedded lug 23*b* which is embedded with a lifting cam 26*a* (as illustrated in FIG. 6A) formed at the side of a cylindrical cam gear 26 (namely a control gear) are formed at the left end of the mechanism base 23. A motor 27 is arranged at the left end of the lower base 4, and a reduction gear assembly 28 is formed on the left end face of the lower base 4. As illustrated in FIG. 12, the reduction gear assembly 28 consists of a pulley gear 28*b* which drives the motor 27 to rotate via a conveyer belt 28*a*, a fifth gear 28*c* which is engaged with the pulley gear 28*b*, a sixth gear 28*d* which is engaged with the fifth gear 28*c*, a seventh gear 28*e* which is engaged with the sixth gear 28*d* and has a hasuba gear, and an eighth gear 28*f* which is engaged with the seventh gear 28*e*. In addition, the gear assembly is protected by a cover 29 which covers the left end face of the lower base 4.

Figure 6B:
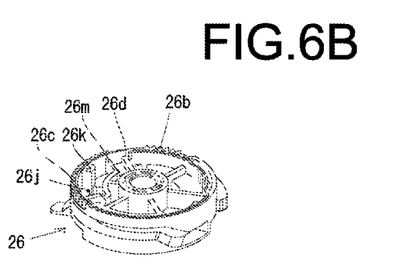
Figure 7:
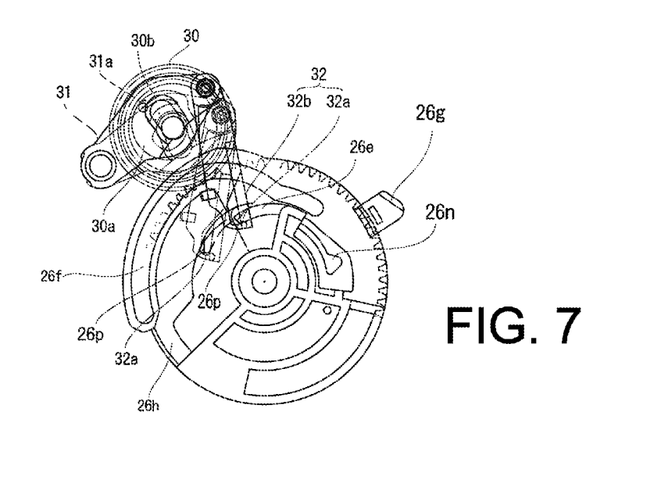
FIG. 7 is a plan view illustrating the relationship between a hook component and the cam gear for the optical-disc player.

As illustrated in FIG. 6B, a first toothed portion 26*b* and a second toothed portion 26*c* are formed on the periphery of the cam gear 26, and a toothless portion 26*d* is formed between the two toothed portions. Moreover, a ninth gear (namely a driving gear) 30 which is engaged with the first toothed portion 26*b* and the second toothed portion 26*c* is formed on the lower base 4. The motor 27 is driven to rotate through the engagement of the ninth gear 30 and the hasuba gear of the seventh gear 28*e*. A shaking component 31 is arranged above the ninth gear 30, and one end of the shaking component 31 is supported by a shaft on the left end wall of the lower base 4 and moves freely. As illustrated in FIG. 7, the shaking component 31 is provided with a convex slide pin 31*a* towards the ninth gear 30. Moreover, an eccentric groove 30*a* and a circular arc cam 30*b* which are embedded with the slide pin 31*a* are formed on the ninth gear 30.

Furthermore, a hook component 32 is freely rotatably shaft-supported by the other end of the shaking component 31. The other end is endowed with a rotary force along the center towards the counterclockwise direction by the hook component 32 via an elastic force not illustrated in the figure. A hook portion 32*a* is formed at the rotation front of the hook component 32 which is disposed at the upper side of the cam gear 26, and can be embedded with an end section 26*p* of a circular arc lug (namely a convex portion) 26*e* formed on the cam gear 26. Moreover, a wall (namely a contact portion) 32*b* which can make contact with the lug 15*b* of the second optical-disc sensor lever 15 is formed on the hook component 32. Furthermore, a circular arc cam groove 26*f* which is embedded with one end 20*a* of the clamper control board 20 and a concave portion 26*h* which is embedded with the pin stop 18*a* of the trigger arm 18 are formed on the cam gear 26. Not only the lifting cam 26*a* is formed on the periphery of the cam gear 26 but also a corner 26*g* which can be embedded with the lug 15*b* of the second optical-disc sensor lever 15 and the hook component 32*a* is formed on the periphery of the cam gear 26.

Figure 4:
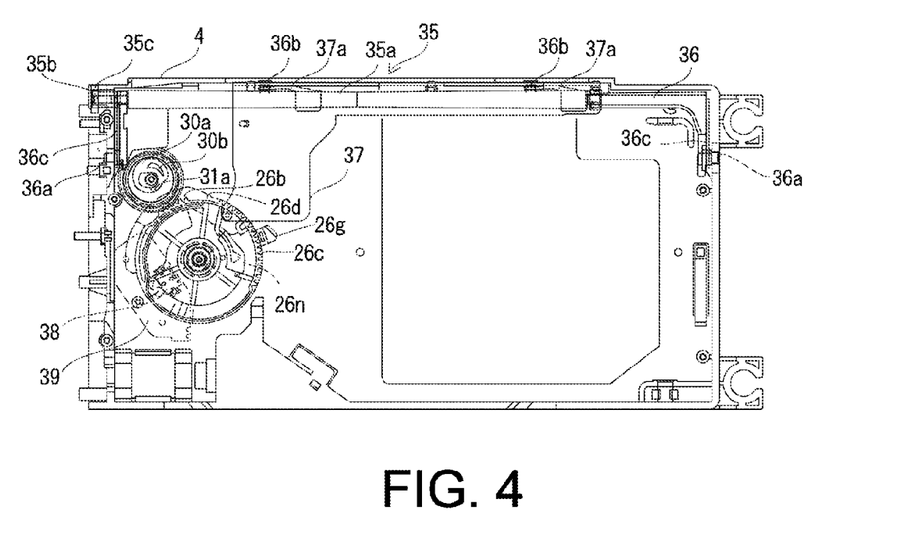
FIG. 4 is a plan view of a lower base for the optical-disc player after a traverse mechanism and a mechanism base are removed.

FIG. 4 is a plan view of the lower base 4 after the traverse mechanism 22 and the mechanism base 23 are removed. A fulcrum shaft 36*a* of a roller supporting plate 36 (a roller supporting component) is shaft-supported by the left and right walls of the lower base 4, and a conveying roller 35 is freely rotatably arranged on the roller supporting plate 36. Moreover, a torsion coil spring 36*c* is arranged on the fulcrums shaft 36*a* of the roller supporting plate 36. The roller supporting plate 36 is endowed with a force used for driving the conveying roller 35 to move to the optical-disc guide plate 21 by the torsion coil spring 36*c*. Furthermore, the conveying roller 35 is arranged at a position opposite to the optical-disc guide plate 21 and consists of a rubber roller 35*a*, a mandrel 35*b* and a tenth gear 35*c*, wherein the rubber roller 35*a* is bicone-shaped with the diameter to be gradually increased from the center to the left-and-right direction, and the tenth gear 35*c* is formed at the left end of the mandrel 35*b* and is often engaged with the eighth gear 28*f* to drive the motor 27 to rotate. In addition, a sliding plate (namely a driving member) 37 embedded with the lower part of the cam gear 26 is horizontally and freely movably arranged on the lower base 4, and a third switch 38 embedded with the cam gear 26 and a base 39 provided with the switch are arranged under the cam gear 26.

Figure 5:
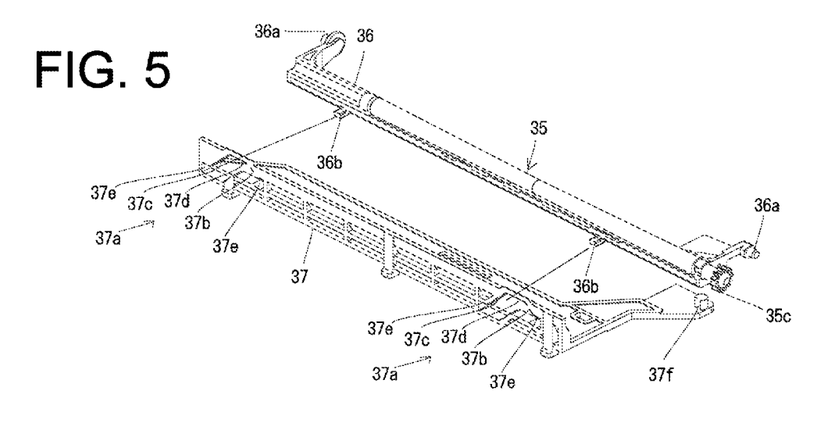
FIG. 5 is a diagram illustrating the engagement between a roller supporting component and a driving component for the optical-disc player.

FIG. 5 illustrates the relationship between the roller supporting plate 36 and the sliding plate 37, wherein a convex second embedded lug 36*b* is formed on the roller supporting plate 36 towards the direction of the sliding plate 37 at one side of two end parts, and an E-shaped cam hole 37*a* slideably connected with the second embedded lug 36*b* is formed on the sliding plate 37. More specifically, the cam hole 37*a* consists of a first inclined cam 37*b* and a second inclined cam 37*c* which drive the roller supporting plate 36 to rotate towards the lower base 4 along with the movement of the sliding plate 37, a top portion 37*d* which is formed between the first inclined cam 37*b* and the second inclined cam 37*c* and has the function of allowing the roller supporting plate 36 to rotate to a position at which the conveying roller 35 and the optical-disc guide plate 21 are connected with each other, and straightline portions 37*e* which are formed at respective end parts of the first inclined cam 37*b* and the second inclined cam 37*c* and parallel to the moving direction of the sliding plate 37. Moreover, an embedded pin 37*f* protruded towards the lower side of the cam gear 26 is formed on the sliding plate 37.

FIG. 6A illustrates the upper side of the cam gear 26 and FIG. 6B illustrates the lower side of the cam gear 26. A first wall 26*j*, a second wall 26*k*, a third wall 26*m* and a resilient tongue 26*n* which make contact with the embedded pin 37*f* when the cam gear 26 rotates are formed on the lower side of the cam gear 26. Various walls and the tongue make proper contact with the embedded pin 37*f* along with the rotation of the cam gear 26, and then the sliding plate 37 is driven to move to and fro.

FIG. 7 illustrates the relationships among the ninth gear 30, the shaking component 31, the hook component 32 and the cam gear 26. The shaking component 31 represented by the dashed line drives the rotation front end to be close to the cam gear 26, and the slide pin 31*a* protruded towards the ninth gear 30 is disposed in the eccentric groove 30*a*. Herein, the hook portion 32*a* of the hook component 32 arranged at the rotation front may be embedded with the end section 26*p* of the circular arc lug 26e of the cam gear 26. Moreover, along with the counterclockwise rotation of the ninth gear 30, once the slide pin 31a is embedded with the circular arc cam 30b, the shaking component 31 can drive the rotation front end to be disengaged from the cam gear 26 as shown by the solid line. Herein, although the hook component 32 also moves towards the direction of the cam gear 26, due to the embedding between the hook portion 32a and the end section 26p of the circular arc lug 26e, the hook component 32 drives the cam gear 26 to rotate clockwise along with the shaking of the shaking component 31. Herein, the first toothed portion 26b of the cam gear 26 is engaged with the ninth gear 30 and the cam gear 26 is driven to rotate clockwise by the rotation of the ninth gear 30.

The operations of the optical-disc player are given below with the attached FIGS. 8 to 15.

Figure 8A:
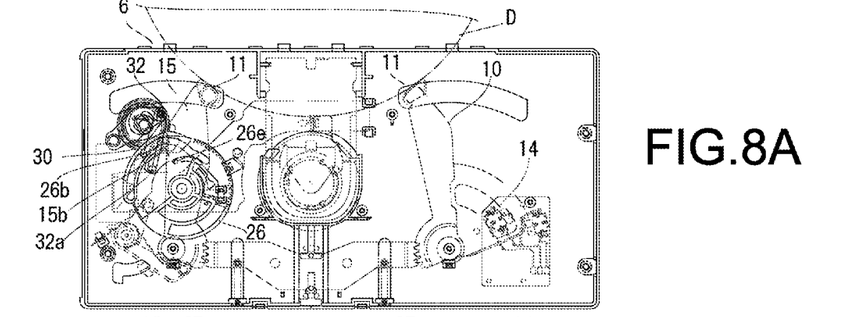
FIGS. 8A and 8B are plan views of the optical-disc player when an optical disc is inserted.
Figure 8B:
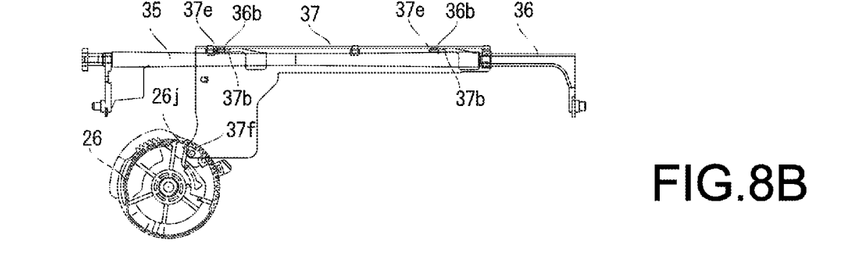

FIG. 8A illustrates the moment before the second switch 14 is turned into ON state after the optical disc D is inserted into the optical-disc inserting opening 6 and the first optical-disc sensor lever 10 rotates clockwise. In addition, FIG. 8B illustrates the relationship between the sliding plate 37 and the roller supporting plate 36.

As illustrated in FIG. 8A, the first toothed portion 26b of the cam gear 26 is engaged with the ninth gear 30. In addition, the second optical-disc sensor lever 15 rotates counterclockwise and the lug 15b makes contact with the wall 32b of the hook component 32, and then the hook component 32 is driven to rotate clockwise. Due to the rotation, the hook portion 32a of the hook component 32 is driven to move towards the outside of a rotation path of the end section 26p of the circular arc lug 26e and move to a position at which the hook portion 32a is not embedded with the end section 26p of the circular arc lug 26e. Moreover, as illustrated in FIG. 8B, the second embedded lug 36b of the roller supporting plate 36 is embedded with the straightline portion 37e at the end part of the first inclined cam 37b of the sliding plate 37. Therefore, the conveying roller 35 is driven by the roller supporting plate 36 to move to the position at which the conveying roller 35 and the optical-disc guide plate 21 are disengaged from each other. Furthermore, the first wall 26j of the cam gear 26 is opposite to the embedded pin 37f of the sliding plate 37.

Figure 9A:
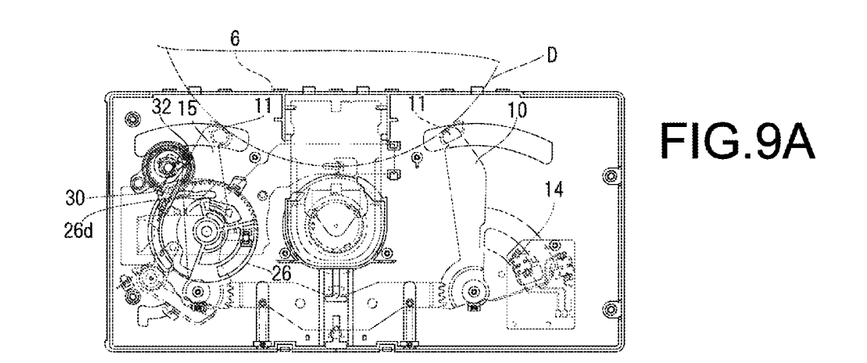
FIGS. 9A and 9B are plan views of the optical-disc player when the optical disc begins to be conveyed.
Figure 9B:
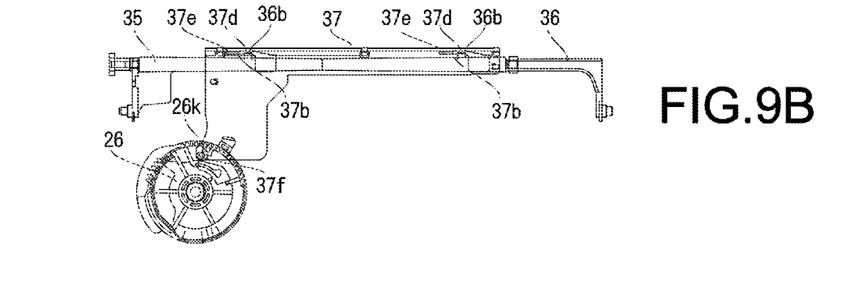

FIG. 9A illustrates the state that: when the optical disc D is inserted, the second switch 14 is in the ON state; the motor 27 is started; the cam gear 26 is driven to rotate counterclockwise by the rotation of the ninth gear 30; and the rotation process stops until the toothless portion 26d is opposite to the ninth gear 30. Herein, as illustrated in FIG. 9B, the embedded pin 37f is pressed by the second wall 26k along with the rotation of the cam gear 26 and the sliding plate 37 is driven to move to the left, and then the second embedded lug 36b of the roller supporting plate 36 is driven to move to the top portion 37d from the straightline portion 37e disposed at the end part of the first inclined cam 37b of the sliding plate 37 via the first inclined cam 37b. Therefore, the conveying roller 35 is driven by the roller supporting plate 36 to move to a position close to the optical-disc guide plate 21, and the optical disc D is clamped by the conveying roller 35 and the optical-disc guide plate 21. Moreover, the optical disc D is conveyed to the conveying roller 35 via the rotation of the gear assembly 28 along with the starting of the motor 27, and then the conveying roller 35 begins to convey the optical disc D towards a play position.

Figure 10A:
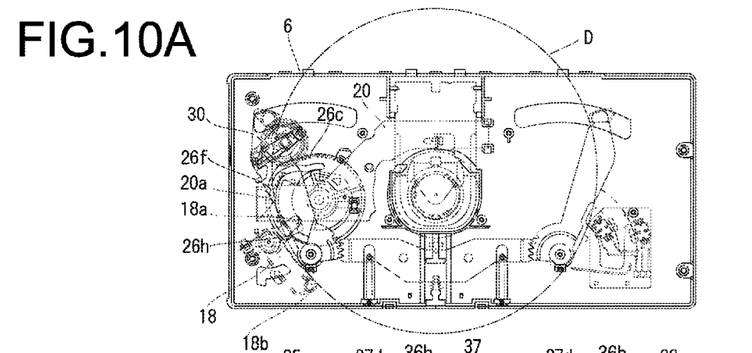
FIGS. 10A and 10B are plan views of the optical-disc player when a trigger arm operates.
Figure 10B:
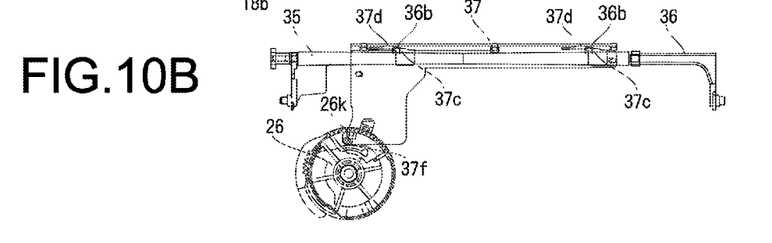

FIG. 10A illustrates the state before the optical disc D is conveyed to the play position by the conveying roller 35. Herein, the peripheral front end of the optical disc D conveyed makes contact with the other end 18b of the trigger arm 18, and the trigger arm 18 is driven to rotate clockwise. Along with the rotation of the trigger arm 18, the pin stop 18a is embedded with the edge of the concave portion 26h of the cam gear 26, and the cam gear 26 is driven to rotate counterclockwise. Along with the rotation of the cam gear 26, the second toothed portion 26c of the cam gear 26 is engaged with the ninth gear 30, and the cam gear 26 begins to rotate counterclockwise along with the rotation of the ninth gear 30. One end 20a of the clamper control board 20 is driven by the circular arc cam groove 26f of the cam gear 26 along with the rotation of the cam gear 26, and then the clamper control board 20 is driven to move to the right. Moreover, as illustrated in FIG. 10B, the embedded pin 37f of the sliding plate 37 is pressed by the second wall 26k, and then the sliding plate 37 begins to move to the left. Herein, the second embedded lug 36b of the roller supporting plate 36 is embedded with the second inclined cam 37c of the sliding plate 37 from the top portion 37d, and then the conveying roller 35 begins to move to the position at which the conveying roller 35 and the optical-disc guide plate 21 are disengaged from each other.

Figure 11A:
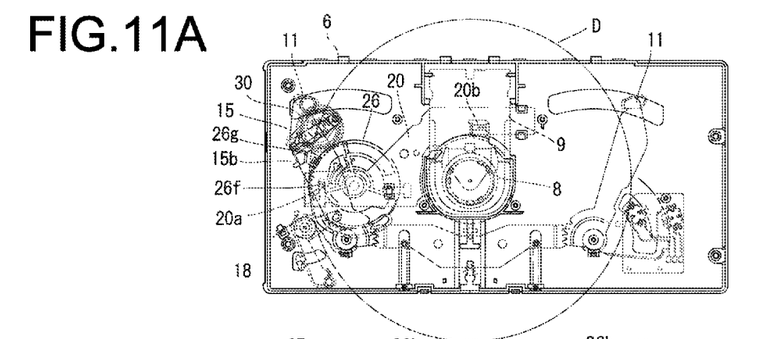
FIGS. 11A and 11B are plan views of the optical-disc player when the optical disc is played.
Figure 11B:
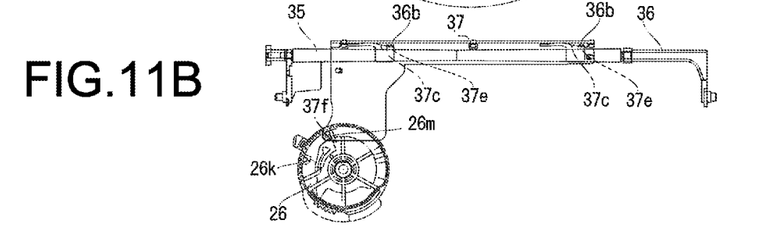

FIG. 11A illustrates the state when the optical disc D arrives at the play position. Herein, the cam gear 26 is disposed on a counterclockwise rotation terminal and the third switch 38 is turned into OFF state, and then the motor 27 is driven to stop rotating. In addition, the embedded pin 37f of the sliding plate 37 is disengaged from the rotation path of the second wall 26k and opposite to the third wall 36m. In the process that the embedded pin 37f is disengaged from the rotation path of the second wall 26k, the sliding plate 37 is conveyed to a left-moving terminal position. Moreover, in the process, the conveying roller 35 is guided to a position at which the conveying roller 35 is most disengaged from the optical-disc guide plate 21 by the second inclined cam 37c via the second embedded lug 36b of the roller supporting plate 36. Furthermore, as illustrated in FIG. 11B, once the sliding plate 37 is conveyed to the left-moving terminal position, the second embedded lug 36b of the roller supporting plate 36 will arrive at the straightline portion 37e formed at the end part of the second inclined cam 37c, and the conveying roller 35 is driven to stop at the position at which the conveying roller 35 is most disengaged from the optical-disc guide plate 21.

Moreover, on the counterclockwise rotation terminal of the cam gear 26, the mechanism base 23 is driven by the lifting cam 26a at the side of the cam gear 26 towards the direction of the clamper 8 via the first embedded lug 23b. In addition, one end 20a of the clamper control board 20 is driven by the circular arc cam groove 26f of the cam gear 26, and the clamper control board 20 is driven to move to the right, and then the third cam 20b is disengaged from the clamper supporting plate 9, and finally the clamper 8 is driven to move towards the direction of the turntable 22a. After a series of operations, the optical disc D is clamped by the turntable 22a and the clamper 8 and can be played. Moreover, the lug 15b of the second optical-disc sensor lever 15 is driven to rotate counterclockwise by the corner 26g of the cam gear 26 until the lugs 11 of the second optical-disc sensor lever 15 and the first optical-disc sensor lever 10 do not affect the rotation of the optical disc D.

FIG. 12 is a side view of the optical-disc player when the optical disc D arrives at the play position. Herein, the conveying roller 35 is disengaged from the optical disc D and kept at a position at which the rotation of the optical disc D is not affected. And the optical disc D is also disengaged from the optical-disc guide plate 21. As for both ends of the optical disc D, one end is protruded out of the convex hole 7 of the frame 1 and the other end is protruded out of the optical-disc inserting opening 6.

Figure 13A:
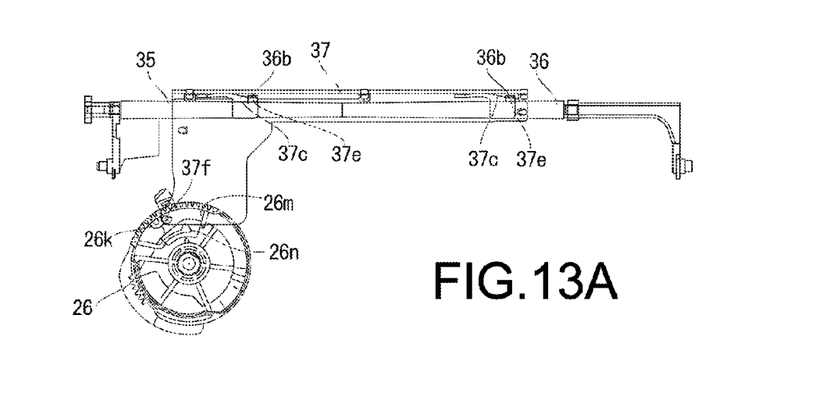
FIGS. 13A and 13B are plan views illustrating the relationship between the roller supporting component and the driving member when the optical disc is taken out.
Figure 13B:
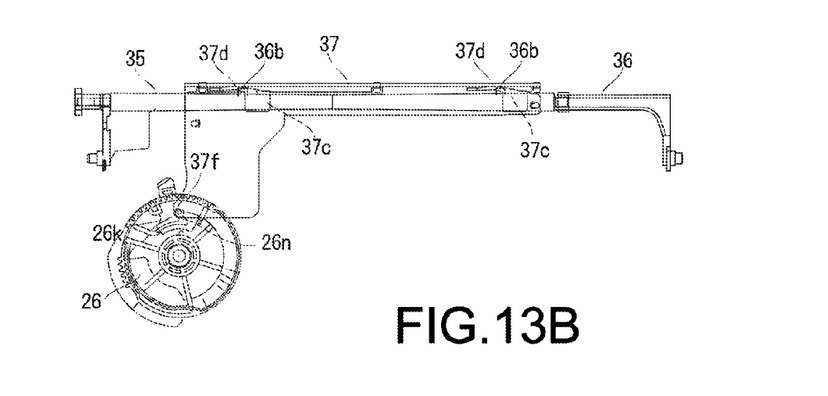

FIGS. 13A and 13B illustrate the relationship between the sliding plate 37 and the roller supporting plate 36 when the optical disc D in the play state is taken out. Once the optical disc D is taken out, the motor 27 will rotate counterclockwise and the cam gear 26 will rotate clockwise. As illustrated in FIG. 13A, along with the rotation, the embedded pin 37*f* is disengaged from the third wall 26*m* and makes contact with the second wall 26*k*, and then the sliding plate 37 is driven to move to the right. Moreover, in the period when the embedded pin 37*f* arrives at the second wall 26*k* from the third wall 26*m*, the turntable 22*a* of the traverse mechanism 22 is pulled away from the clamper 8 by the lifting cam 26*a* at the side of the cam gear 26 via the first embedded lug 23*a*. In addition, the clamper control board 20 is driven to move to the left by the circular arc cam groove 26*f* of the cam gear 26, and the clamper 8 is pulled away from the turntable 22*a* by the third cam 20*b* of the clamper control board 20. After a series of operations, the optical disc D is released from being clamped by the turntable 22*a* and the clamper 8.

Along with the clockwise rotation of the cam gear 26, the embedded pin 37*f* is pressed by the second wall 26*k* and the sliding plate 37 is driven to move to the right. Herein, the second embedded lug 36*b* is disengaged from the straightline portion 37*e* and arrives at the second inclined cam 37*c*. And then the sliding plate 37 is driven to move to the right by the second embedded lug 36*b* under the action of an elastic force of the torsion coil spring 36*c* applied to the roller supporting plate 36. As the movement is performed via the elastic force, the movement is fierce. In order to relieve the fierce movement impact, the resilient tongue 26*n* is formed on the cam gear 26. As illustrated in FIG. 13B, the impact is softened as the embedded pin 37*f* of the sliding plate 37 makes contact with the resilient tongue 26*n*. When the sliding plate 37 moves to the right, the second embedded lug 36*b* moves to the top portion 37*d*. Herein, the conveying roller 35 is driven by the roller supporting plate 36 to meet with the optical disc D and begins to convey the optical disc D towards the direction of the optical-disc inserting opening 6, and stops rotating until the toothless portion 26*d* of the cam gear 26 is opposite to the ninth gear 30.

Figure 14:
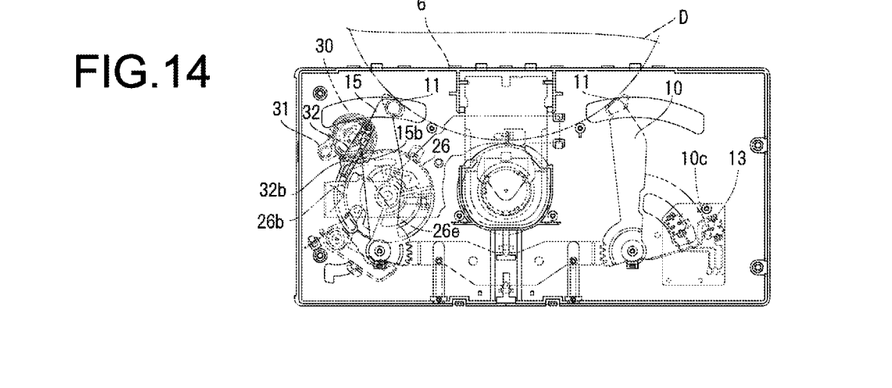
FIG. 14 is a plan view of the optical-disc player when a first switch operates.

FIG. 14 illustrates the state when the optical disc D is conveyed to a withdrawn position. Once the optical disc D is conveyed to the withdrawn position, the first optical-disc sensor lever 10 will rotate counterclockwise; the first switch 13 is driven by the first cam 10*c* to be turned into OFF state; and the motor 27 is driven to stop rotating. Herein, the lugs 11 of the first optical-disc sensor lever 10 and the second optical-disc sensor lever 15 make contact with the periphery of the optical disc D, and the first optical-disc sensor lever 10 and the second optical-disc sensor lever 15 have not rotated to be restored to initial positions. Moreover, the optical disc D is in the state of being clamped by the conveying roller 35 and the optical-disc guide plate 21 and will not be dropped out from the optical-disc inserting opening 6.

Figure 15A:
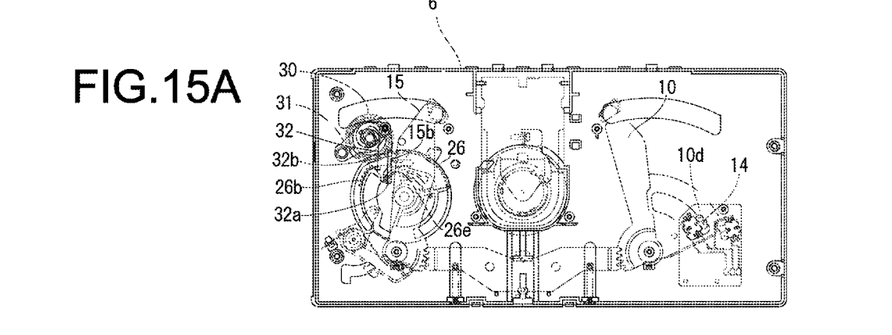
FIGS. 15A and 15B are plan views of the optical-disc player when a second switch operates.

FIG. 15A illustrates the state when the optical disc D is taken out from the optical-disc inserting opening 6. In the process that the optical disc D is taken out from the optical-disc inserting opening 6, the first optical-disc sensor lever 10 is restored to the initial position. Herein, the second switch 14 is turned into OFF state by the second cam 10*d*; the motor 27 is started; and the ninth gear 30 begins to rotate. However, as the toothless portion 26*d* of the cam gear 26 is opposite to the ninth gear 30, the cam gear 26 does not rotate. Moreover, in the process that the second optical-disc sensor lever 15 is restored to the initial position, the lug 15*b* and the wall 32*b* of the hook component 32 do not make contact with each other. And then the hook portion 32*a* of the hook component 32 may be embedded with the end section 26*p* of the circular arc lug 26*e* of the cam gear 26. In addition, the slide pin 31*a* of the shaking component 31 is embedded with the circular arc cam 30*b* from the eccentric groove 30*a* along with the rotation of the ninth gear 30. Consequently, as illustrated in FIG. 7, the rotation front end is shook from a position represented by the dashed line to a position represented by the solid line through the shaking component 31 and disengaged from the cam gear 26. Herein, the hook component 32 also moves from the cam gear 26 to the disengaged direction. However, as the hook portion 32*a* is embedded with the end section 26*p* of the circular arc lug 26*e* of the cam gear 26, the cam gear 26 is driven to rotate clockwise during the movement from the position represented by the dashed line to the position represented by the solid line. And then the first toothed portion 26*b* of the cam gear 26 is engaged with the ninth gear 30, and the cam gear 26 begins to rotate clockwise along with the rotation of the ninth gear 30.

Figure 15B:
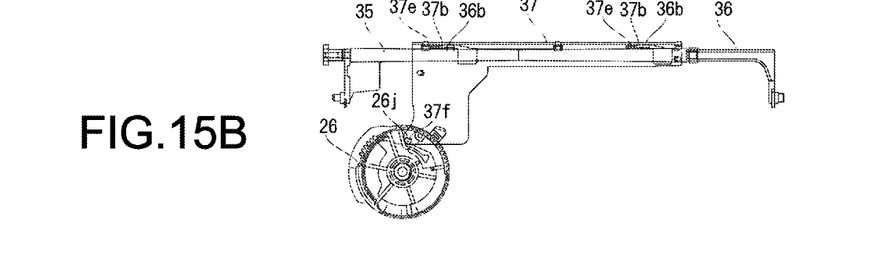

As illustrated in FIG. 15B, along with the rotation of the cam gear 26, the embedded pin 37*f* of the sliding plate 37 is driven by the first wall 26*j*, and then the sliding plate 37 is driven to move to the right. Along with the movement, the first inclined cam 37*b* of the sliding plate 37 is embedded with the second embedded lug 36*b* of the roller supporting plate 36, and the roller supporting plate 36 is driven to rotate towards the direction in which the conveying roller 36 is disengaged from the optical-disc guide plate 21. Moreover, on the clockwise rotation terminal of the cam gear 26 (as illustrated in FIG. 8), the second embedded lug 36*b* is embedded with the straightline portion 37*e* at the end part of the first inclined cam 37*b*. Along with the operation, the conveying roller 35 is disengaged from the optical-disc guide plate 21, and a gap which does not obstruct the insertion of the optical disc D to be inserted next time is formed between the conveying roller 35 and the optical-disc guide plate 21 and kept at the disengaged position. Due to the gap formed between the conveying roller 35 and the optical-disc guide plate 21, the optical disc D to be inserted into the optical-disc inserting opening 6 next time has no insertion impedance and can be smoothly inserted. Furthermore, the third switch is turned into OFF state on the clockwise rotation terminal of the cam gear 26, and the motor is driven to stop rotating.

In the embodiment 1, the lugs 11 of the first optical-disc sensor lever 10 and the second optical-disc sensor lever 15 are formed between the conveying roller 35 and the turntable 22*a*. The lugs 11 can also be formed between the conveying roller 35 and the optical-disc inserting opening 6, at positions close to the conveying roller 35. As the lugs 11 of the first optical-disc sensor lever 10 and the second optical-disc sensor lever 15 can be set like this, the dimension of the optical-disc player in the optical-disc conveying direction can be reduced, and thus the miniaturization of the device can be realized.

The invention can be applied to optical-disc players for playing CD, VCD, DVD and the like.

What is claimed is:

1. An optical-disc player, comprising:
a pair of optical-disc sensor levers (10) (15) respectively having a detection part capable of being embedded into the periphery of an optical disc (D) inserted into an optical-disc inserting opening (6) and rotating immediately once the detection part driven by the optical disc;
a conveying roller (35) used for clamping the optical disc on an optical-disc guide plate (21) and conveying the optical disc between the optical-disc inserting opening and a turntable (221) through the rotation of a motor (27);

a roller supporting component (36) used for supporting the conveying roller;

a driving member (37) embedded with the roller supporting component and used for driving the conveying roller and the optical-disc guide plate to be engaged and disengaged during the reciprocating motion;

a cam gear (26) used for moving the driving member;

a driving gear (30) used for driving the cam gear via a rotary force of the motor;

switches (13) (14) (38) used for controlling the rotation of the motor, and a traverse mechanism (22) having a pick-up (25) and the turntable, wherein the component is embedded with the roller supporting component and used for driving the conveying roller and the optical-disc guide plate to be engaged and disengaged, on the driving member being an E-shaped cam hole (37a); and a convex portion (26e), a first toothed portion (26b) and a second toothed portion (26c) formed on the cam gear, and a toothless portion (26d) are formed between the two toothed portions;

the optical-disc player also comprising:

a shaking component (31) embedded onto the driving gear and shaking along with the rotation of the driving gear, and a hook component (32) supported by the shaking component, wherein the hook component has a contact portion (32b) capable of being embedded with the optical-disc sensor lever and a hook portion (32a) capable of being embedded with the convex portion of the cam gear;

when the optical disc taken out from the optical-disc inserting opening, the hook portion embedded with an end section (26p) of the convex portion by the disembedding between the optical-disc sensor lever and the contact portion; the cam gear driven to rotate by the shaking of the shaking component via the hook component and the driving gear engaged with the first toothed portion; the cam gear driven to rotate continuously and the driving member driven to move to a mobile terminal position, and then the conveying roller and the optical-disc guide plate disengaged from each other.

2. The optical-disc player according to claim 1, wherein the switches consist of a first switch (13) used for driving the motor to stop rotating when the optical disc is conveyed from a play position to the optical-disc inserting opening until the optical disc can be taken out, a second switch (14) used for starting the motor when the optical disc is taken out from the optical-disc inserting opening, and a third switch (38) used for driving the motor to stop rotating on a rotation terminal of the cam gear.

3. The optical-disc player according to claim 1, wherein the detection parts of the optical-disc sensor levers are arranged between the conveying roller and the turntable.

4. The optical-disc player according to claim 1, wherein the moving direction of the pick-up for the traverse mechanism is perpendicular to the optical-disc conveying direction.

\* \* \* \* \*